UNITED STATES PATENT OFFICE.

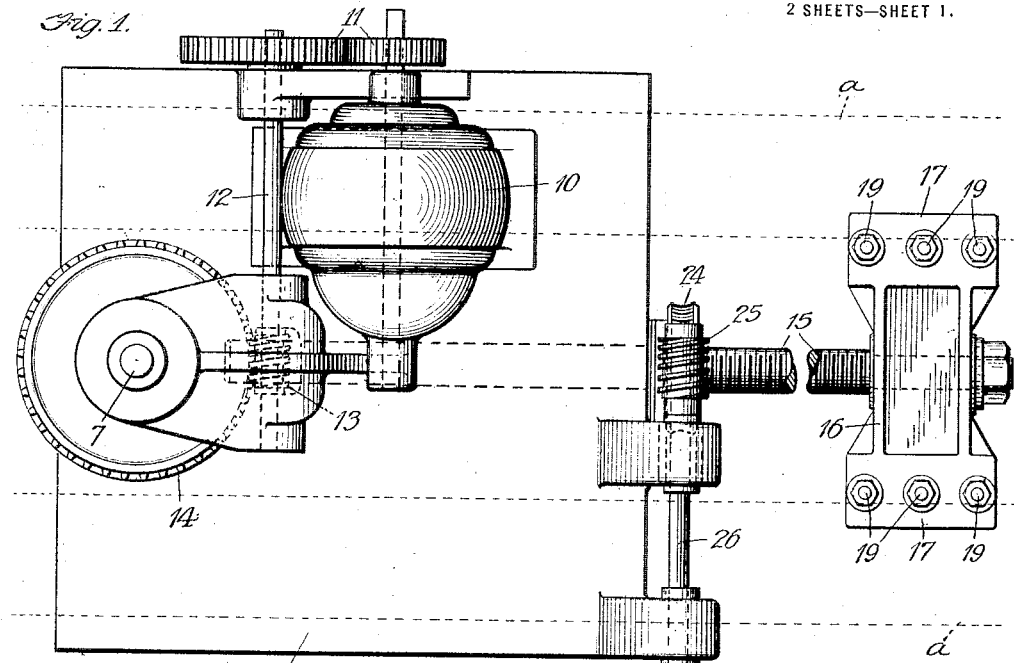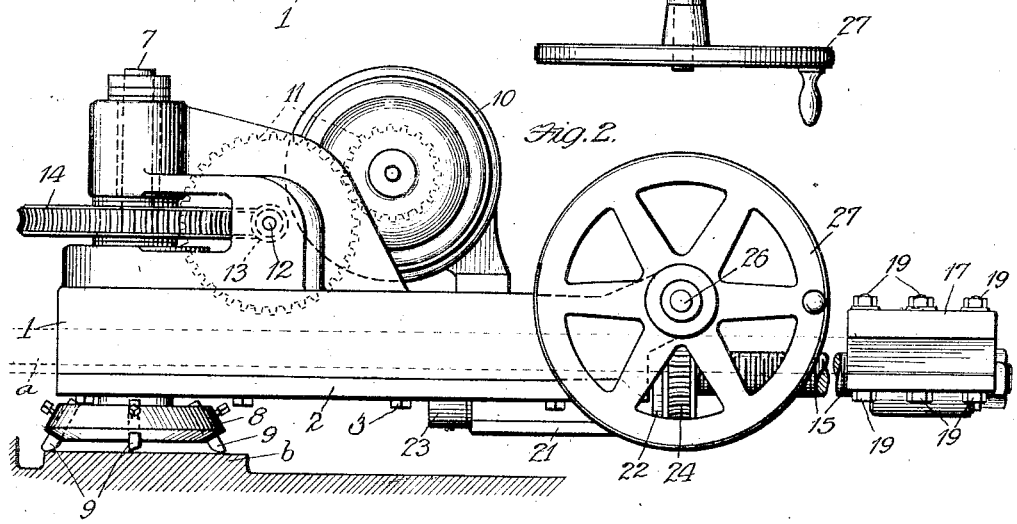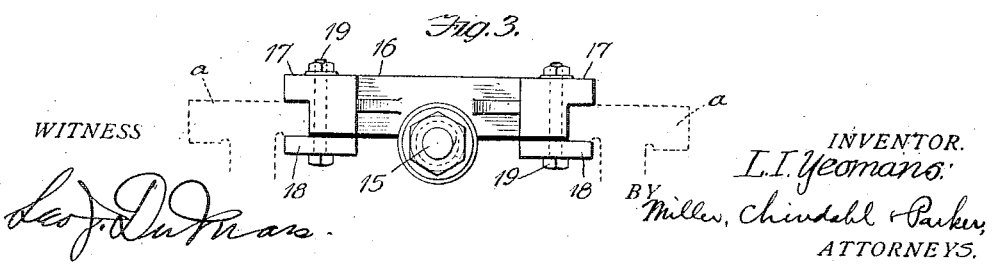

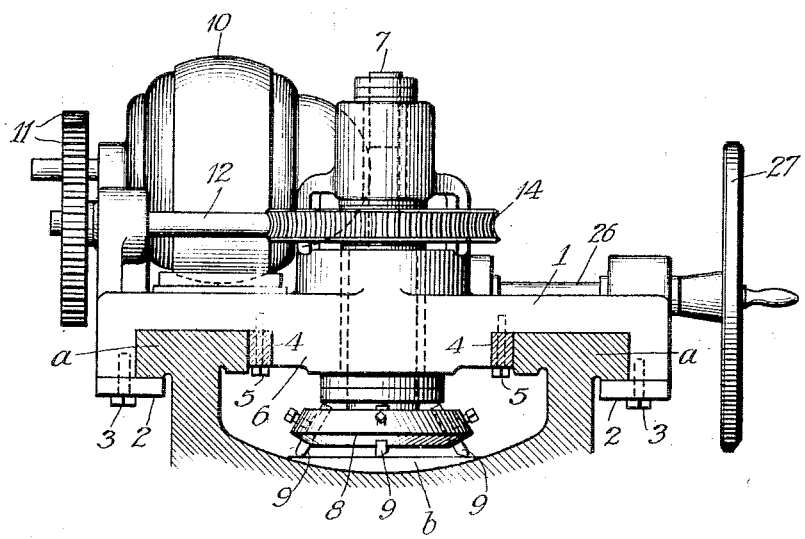
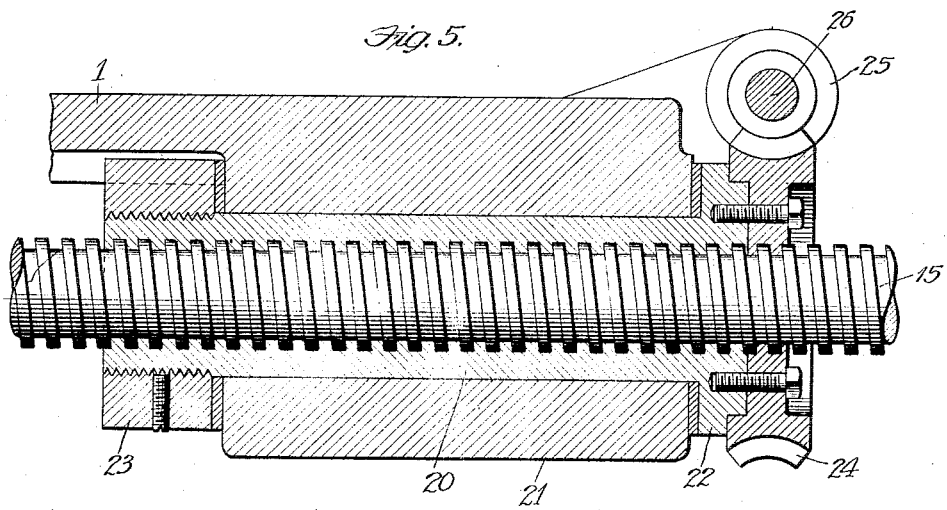

LUCIEN I. YEOMANS, OF CHICAGO, ILLINOIS, ASSIGNOR TO AMALGAMATED MACHINERY CORPORATION, OF CHICAGO, ILLINOIS, A CORPORATION OF DELAWARE.

PAD-FACING MACHINE.

1,309,385.

Specification of Letters Patent.

Patented July 8, 1919.

Application filed May 23, 1918. Serial No. 236,121.

*To all whom it may concern:*

Be it known that I, LUCIEN I. YEOMANS, a citizen of the United States, residing at Chicago, in the county of Cook and State of Illinois, have invented certain new and useful Improvements in Pad-Facing Machines, of which the following is a specification.

Lathes, gun-boring machines and similar machines are provided with ways to support a carriage, and with bearings to support a lead screw for moving the carriage. The lead screw extends longitudinally of the machine, midway between the carriage ways, and the bearings for the screw are mounted upon "pads" or raised surfaces cast in the bed of the machine. These pads are located within the bed.

The primary object of this invention is to provide means for machining the pads so that the surfaces thereof shall be at the desired distance below the carriage ways. The invention will accordingly be described and illustrated as embodied in such a machine, but it will be understood that the invention may be applicable to other uses.

In the accompanying drawings, Figure 1 is a top plan view of a pad-facing machine embodying the features of my invention. Fig. 2 is a side elevation thereof. Fig. 3 is a view showing a means for attaching a feed screw to the ways of the lathe. Fig. 4 is a view looking from the left-hand side of Fig. 2. Fig. 5 is a detail view of the feeding means.

The finished carriage ways of the lathe, gun-boring machine or other machine to be operated upon, are indicated at $a$, there being two parallel ways. Between the ways are one or more pads $b$ to support bearings (not shown) for the carriage-feeding screw. The surface of these pads should be at a definite distance below the top of the ways $a$.

The machine for facing the pads $b$ comprises a carriage 1 adapted to slide upon the ways $a$. Said carriage is provided at opposite sides with plates 2 underlying the outer portions of the ways $a$, said plates being secured to the carriage by means of cap screws 3. 4 are filler bars secured to the carriage by means of cap screws 5 and occupying the space between the ways $a$ and the central downwardly extending portion 6 on the carriage. These filler bars may be removed when the pad-facing machine is to be employed upon a lathe or the like in which the ways $a$ are closer together than as shown in the present drawings.

A shaft 7 is rotatably mounted in vertical bearings upon the carriage 1 and has fixed to its lower end a head 8 carrying suitable tools 9 for finishing the surfaces of the pads $b$. The head 8 is of such size and the tools 9 are so located as to operate upon as much as necessary of the width of a pad $b$. The shaft 7 may be driven by any suitable means, as for example, an electric motor 10 mounted upon the carriage 1 and connected by means of gears 11 to a shaft 12, the shaft 12 being connected to the shaft 7 by means of a worm 13 and a worm wheel 14.

The means for feeding the carriage 1 along the ways $a$ comprises a screw 15 fixed at one end to a bracket or cross piece 16, said bracket having flanges 17 that overlie the inner portions of the ways $a$. 18 are clamping plates which are clamped to the lower surfaces of the inner portions of the ways $a$ by means of bolts 19. The screw 15 is engaged by an internally-threaded sleeve or nut 20 (Fig. 5) which is rotatably mounted in a bearing 21 upon the lower side of the carriage 1. The sleeve 20 is held against endwise movement with relation to the carriage by means of a flange 22 and a nut 23. Rigidly secured to the flange 22 is a worm wheel 24 that meshes with a worm 25 fixed on a shaft 26. The shaft 26 is provided with a hand wheel 27. It will be seen that by rotating the hand wheel 27 the carriage 1 may be made to travel along the ways $a$ so as to carry the tools 9 over the surface of a pad $b$.

When one pad has been faced, the clamping plates 18 are loosened and the pad-facing machine pushed along the ways into operative relation to another pad.

After all of the pads have been faced, the pad-facing machine may be slid off the ends of the ways, if the ways will permit of so doing, or the plates 2 and cap screws 3 may be removed and the pad-facing machine lifted off the lathe.

Inasmuch as the pad-facing machine is supported upon the finished carriage ways $a$, the faced surfaces of the pads $b$ will be at the predetermined distance below the ways.

I claim as my invention:

1. A machine for facing a pad upon a lathe or the like provided with carriage ways and a pad between said ways, said pad-facing machine having, in combination, a carriage adapted to be mounted upon the ways of the lathe, a bracket adapted to be clamped to said ways, a feed screw and a nut on the feed screw, one of said screw elements being rigidly connected to one of the two above-mentioned parts (namely the carriage and the bracket) and the other of said screw elements being rotatably connected to the other of said above-mentioned two parts, means for rotating the last-mentioned screw element, a pad-facing tool on said carriage, and means on the carriage for actuating said tool.

2. A machine for facing a pad upon a lathe or the like having two carriage ways and a pad located between and below the ways, said pad-facing machine having, in combination, a carriage adapted to be slidably mounted upon said ways, a vertical shaft supported upon said carriage, a head upon the lower end of said shaft below the carriage, a tool on said head for operating upon the pad, means on the carriage for rotating said shaft, and means for moving the carriage along the ways.

3. A machine for facing a pad upon a lathe or the like having carriage ways and a pad between the ways, said pad-facing machine having, in combination, a carriage adapted to be slidably mounted upon said ways, means detachably connected to said ways for moving said carriage upon the ways, and mechanism on the carriage for facing the pad.

4. A machine for facing a pad upon a lathe or the like having two carriage ways and a pad located between and below the ways, said pad-facing machine having, in combination, a carriage adapted to be slidably and removably mounted upon said ways, a tool on the lower side of the carriage, and means on the carriage for moving the tool in a horizontal plane to face the pad.

5. A machine for facing a pad upon a lathe or the like having two carriage ways and a pad located between and below the ways, said pad-facing machine having, in combination, a carriage adapted to be slidably and removably mounted upon said ways, means detachably connected to said ways for moving said carriage upon the ways, cutting means below the carriage for operating upon the pad, and means on the upper side of the carriage for driving the cutting means.

6. In a portable machine for removing metal from a machine having two parallel carriage ways, the combination of a carriage arranged to slide upon said ways and removable therefrom, and means for feeding the carriage comprising a feed screw and a coöperating nut, one of said screw elements being carried by the carriage, and means for detachably clamping the other of said screw elements to the carriage ways.

7. In a portable machine for removing metal from a machine having carriage guide means, the combination of a carriage arranged to slide upon said guide means and removable therefrom, and means for feeding the carriage comprising a feed screw and a coöperating nut, one of said screw elements being rotatably mounted on the carriage, and means for detachably clamping the other of said screw elements to the carriage guide means.

In testimony whereof, I have hereunto set my hand.

LUCIEN I. YEOMANS.

Copies of this patent may be obtained for five cents each, by addressing the "Commissioner of Patents, Washington, D. C."